Figure 1:
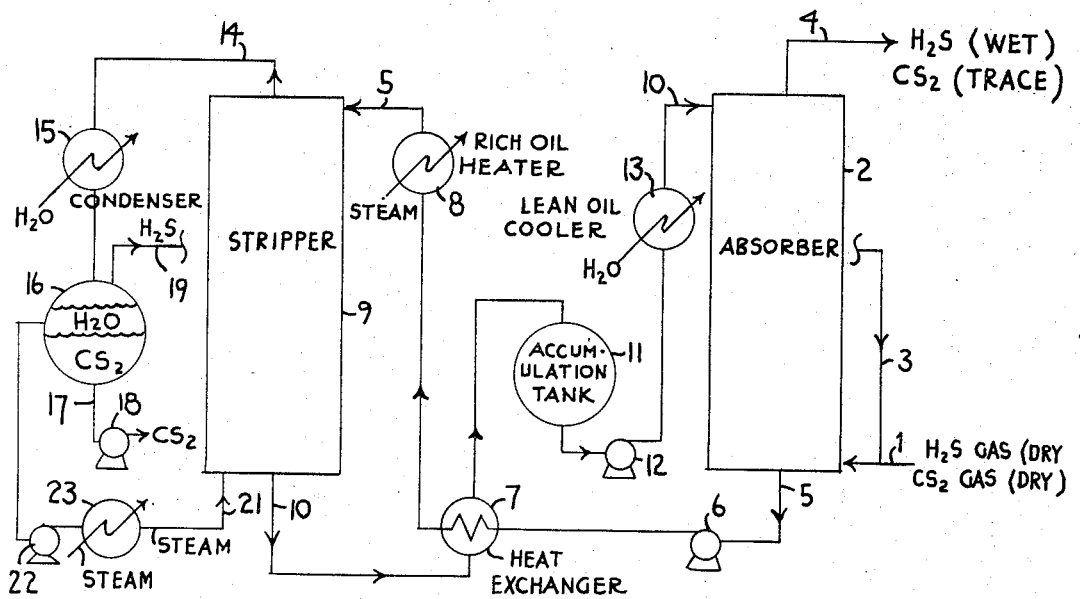

Oct. 10, 1967  H. F. WYATT  3,345,802

RECOVERY OF CS₂ FROM ABSORBING OIL

Filed Dec. 7, 1966

INVENTOR
HOWARD F. WYATT

BY *Chisholm and Spencer*

ATTORNEYS

United States Patent Office 3,345,802
Patented Oct. 10, 1967

3,345,802
RECOVERY OF CS₂ FROM ABSORBING OIL
Howard F. Wyatt, New Martinsville, W. Va., assignor to Pittsburgh Plate Glass Company, Pittsburgh, Pa., a corporation of Pennsylvania
Filed Dec. 7, 1966, Ser. No. 599,827
9 Claims. (Cl. 55—50)

This application is a continuation-in-part of co-pending United States application Ser. No. 392,466, filed Aug. 27, 1964, now abandoned.

This application relates to the production of $CS_2$. More specifically, this invention relates to the recovery of $CS_2$ from absorbing oil. Still more specifically, this invention relates to stripping $CS_2$ from absorbing oil with $H_2S$ gas.

In the commercial production of carbon disulphide, the product $CS_2$ gas is frequently produced in admixture with $H_2S$ gas. An important commercial method of manufacture is the process whereby molten sulfur is mixed with hydrocarbons, e.g., methane or natural gas. The mixture is charged to a furnace operating at high temperature, e.g., about 1200° F. It is then passed over a catalyst such as silica gel to produce a gas comprising both $H_2S$ and $CS_2$. Normally the reaction is conducted in a substantial excess of either the sulfur or the gaseous hydrocarbon. According to the aforedescribed process, when sulfur is reacted with an excess of methane, there are produced two moles of $H_2S$ gas per mole of $CS_2$ gas, i.e., for every ton of carbon disulphide gas produced there is produced about 0.895 ton of hydrogen sulphide gas. By employing a different gaseous hydrocarbon, e.g., ethane, propane, etc., or mixtures of a plurality of hydrocarbons, it is possible to obtain a reaction product containing varying proportions of $H_2S$ and $CS_2$. It can be calculated that even when extremely heavy hydrocarbons e.g., hydrocarbons containing 20 or more carbon atoms, are reacted with sulfur, the gaseous product will always contain in excess of 30 percent $H_2S$. Typically, the initial reaction product obtained in the commercial production of $CS_2$ by the reaction of sulfur with natural gas hydrocarbons contains between about 45 and about 48, rarely below about 43 percent $H_2S$ based on the total weight of $H_2S$ and $CS_2$ in the mixture.

Recovery of $CS_2$ from admixture with $H_2S$ is typically accomplished in at least two stages or operations, each of which comprises a plurality of steps. The entire recovery procedure may thus be divided into an initial or separation procedure whereby the $CS_2$ content of the product stream is substantially upgraded by separating $CS_2$ from $H_2S$ and a final or purification operation whereby the content of $H_2S$ and other impurities is further reduced to provide an acceptable commercial product. The feed to the purification operation, i.e., the product stream from the separation operation typically comprises condensed $CS_2$ liquid. It is commercially desirable that the $H_2S$ content of this feed stream be at a practical minimum, e.g., below about two percent by weight of the stream.

It is possible to provide an acceptable feed to the purification operation by merely preferentially condensing the $CS_2$ from the initial reaction products. Such a procedure is commercially undesirable however. To obtain an acceptable feed in this fashion, large quantities of $CS_2$ must be left uncondensed in admixture with $H_2S$. For this reason, it is usually preferred to upgrade the product stream to contain less than about 10 to about 15 percent by weight $H_2S$, basis the weight of $H_2S$ and $CS_2$ in the stream, prior to preferentially condensing the $H_2S$-$CS_2$ admixture.

According to current commercial practice, the initial $H_2S$-$CS_2$ admixture is contracted in an absorbing zone with an absorbing oil, typically light mineral oil, to absorb $CS_2$ therefrom. The absorbing capacity of the oil varies inversely with its temperature. Thus, the $H_2S$-$CS_2$ admixture is usually contacted with absorbing oil at relatively cool temperatures, typically about 80 to about 90° F. "Cool oil" as used herein and in the claims refers to absorbing oil at temperatures such that if the $CS_2$ saturated oil is heated substantially, a significant amount of $CS_2$ evolves therefrom. The absorbing oil separates from the admixture essentially all, typically above 99 percent of the $CS_2$. About 1000 to 1500 gallons of oil per ton of $CS_2$ in the gas stream are usually sufficient for this purpose. The oil-$CS_2$ mixture typically contains less than about one percent $H_2S$ therein.

$CS_2$ can be recovered from the oil-$CS_2$ mixture by simply heating the mixture to reduce the capacity of the oil to absorb $CS_2$ and allowing the $CS_2$ to evolve therefrom. It is generally economically desirable, however, to separate the $CS_2$ from the absorbing oil at a more rapid rate than is provided by merely heating the mixture. Thus, it has been the practice to contact the oil-$CS_2$ mixture, typically heated to 300° F. or more in a stripping zone with steam thereby stripping $CS_2$ therefrom. In this fashion, most, e.g., in excess of about 99.5 percent of the $CS_2$ is separated from the absorbing oil at a rapid rate. The resulting gaseous mixture is then cooled thereby condensing $CS_2$ and water. The water floats on the liquid $CS_2$ and is conveniently separated therefrom. The $CS_2$, containing minor amounts of $H_2S$, oil, water, and other impurities is then forwarded to additional purification steps.

There are several disadvantages associated with steam stripping the absorbing oil-$CS_2$ mixture to recover $CS_2$. Of primary importance is the introduction of water to the various streams of the recovery system. While the steam strips $CS_2$ from the absorbing oil, water is absorbed by the oil. This water-bearing oil is recycled back to the absorbing apparatus. As the initial $H_2S$-$CS_2$ mixture is contacted by this oil to absorb the $CS_2$ therefrom, the $H_2S$ tends to absorb the water carried by the oil. Thus, the $H_2S$ discharge from the absorber is wet and corrosive. The moisture in the $H_2S$ tends to freeze out in cold weather thereby plugging lines. In addition, water is entrained in the $CS_2$ discharge from the stripping apparatus. Thus, water is carried into the final purification system. It is necessary to cool the absorbing oil as it is cycled from the stripper to the absorber. When this oil carries entrapped water, there is a tendency for an oil and water emulsion to deposit in the cooling apparatus. Such deposits cause loss of heat exchange potential in the cooler and excessive pressure drop through the cooler.

According to this invention, all of the foregoing disadvantages are obviated. In addition, the amount of oil carry-over from the stripping apparatus to the condensation and purification steps is reduced. This oil carry-over must ordinarily be removed to produce an acceptable product. According to this invention, dry $H_2S$ gas, preferably from the absorber discharge, is utilized as the stripping gas. In this fashion, water is eliminated from the system. Surprisingly, utilization of $H_2S$ as a stripping gas requires no significant alteration in the flow sheet of the separation operation. It has been found that the condensed product from the stripper is not only free from moisture but contains no appreciable amount of $H_2S$ in excess of that obtained when steam is used as the stripping gas. Thus, the substitution of $H_2S$ stripping gas has eliminated previous problems encountered when using steam as a stripping gas with no detrimental effect on product quality.

In the practice of the instant invention, the gaseous mixture produced by the reaction of hydrocarbons, notably natural gas, with a source of sulfur, including sulfur-containing minerals such as pyrites but usually elemental sulfur, is contacted in an absorbing zone with absorbing oil. The oil is introduced to the absorbing zone at a sufficiently high temperature that the oil is fluid, i.e., above its freezing point, but at a sufficiently low temperature to insure that the heat of absorption of the $CS_2$ in the oil won't raise the temperature of the oil to a temperature above which the oil can hold an appreciable quantity, i.e., at least about 5 percent by weight based on the oil-$CS_2$ mixture, of $CS_2$. The initial temperature of the oil entering the absorbing zone is thus generally held below about 120° F. typically between about 40 and about 100° F., preferably between about 80 and about 90° F. The temperature of the absorbing oil increases during the absorbing operation due to the heat of absorption of $CS_2$ in the oil. To maintain an acceptable absorption capacity of the oil, the temperature of the oil in the absorption zone is maintained below about 180, typically below about 150, preferably below about 140° F. Sometimes one or more cooling steps are provided during the absorption operation to maintain these temperatures.

The oil-$CS_2$ mixture is forwarded to a stripping zone. In this zone the temperature of the oil is increased, typically at least 100° F. to reduce the capacity of the oil to absorb $CS_2$. Ordinarily the oil-$CS_2$ mixture is heated to above 250° F. up to the boiling point of the absorbing oil prior to stripping. The heated mixture is stripped with $H_2S$ gas in this zone to remove substantially all of the $CS_2$ therefrom. The resulting $CS_2$-$H_2S$ mixture may be utilized as a raw material or it may be treated to recover the $CS_2$. One suitable recovery treatment is cooling to selectively condense the $CS_2$. An alternative recovery treatment is to contact the mixture with activated carbon to selectively absorb the $CS_2$ therein. The $CS_2$ is subsequently recovered from the activated carbon.

The temperatures reported in this disclosure assume a typical low pressure operation, i.e., operations wherein the pressures are not much in excess of atmospheric. Typical absorbing and stripping pressures are below about 10 p.s.i.g., for example. The temperatures disclosed herein should be adjusted if substantially higher or lower operating pressures are selected.

Figure 2:
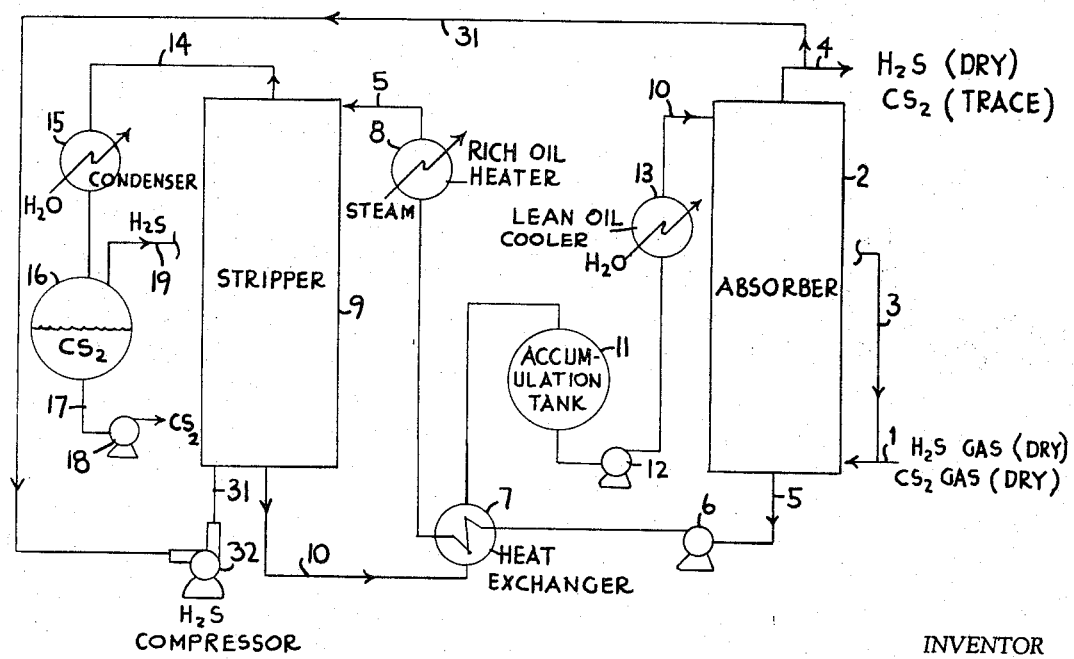

While not intending to limit the invention thereby, the following example illustrates the manner in which this invention may be practiced. The example will be explained with reference to FIGURES 1 and 2. FIGURE 1 is a typical flow sheet for stripping absorbing oil containing $CS_2$ with steam. FIGURE 2 is the corresponding flow sheet when $H_2S$ is substituted for steam as the stripping gas.

EXAMPLE

A feed stream containing approximately two moles of $H_2S$ per mole of $CH_2$ was fed to a commercial operation with the flow sheet depicted by FIGURE 1. The stream was fed at a rate of about 72 tons of $CS_2$ per day through line 1 to absorber 2. The feed stream was contacted by absorbing oil fed through line 10 to the top of the absorber at a rate of about 80 gallons per minute. The particular absorbing oil used in this example was Mentor 28, a nonviscous oil of the mineral seal type marketed by the Esso Oil Company. $H_2S$ gas was withdrawn through line 4 while the absorbing oil containing $CS_2$ was withdrawn through line 5. A recycle stream containing approximately 40 percent $H_2S$ and 60 percent $CS_2$ was passed via line 3 to line 1. The oil stream entered the absorber at approximately 90° F. and left the absorber at approximately 135° F. It was pumped via pump 6 to heat exchanger 7 where it picked up heat from oil recovered from the stripper 9. At the top of the stripper the oil passed through oil heater 8 thereby being heated to a temperature of approximately 350° F. As oil was passed through the stripper, it was contacted by steam entering through line 21 at the base of the stripper. The steam was introduced to the stripper at a rate of about 423 pounds per hour. The steam stripped the $CS_2$ from the oil. The oil was recovered through line 10 and sent back to the absorber first passing through heat exchanger 7 to tank 11, through pump 12 to oil cooler 13 and then to the top of the absorber for recycle through the system. Oil left the stripper at approximately 315° F. The $CS_2$ stream leaving the top of the stripper contained $H_2S$, oil, and steam. It was passed through line 14 to heat exchanger 15 where it was condensed and collected in tank 16. $H_2S$ gas which was not condensed was withdrawn from tank 16 through line 19. The water and $CS_2$ stratified in tank 16 with the water floating on the $CS_2$. The water was withdrawn through line 21 and pumped via pump 22 to heat exchanger 23 where it was converted to steam to be introduced into the stripper through line 21. The $CS_2$ was withdrawn through line 17 and pumped via pump 18 to additional purification steps.

It was found that the $H_2S$ from the absorber overhead 4 was wet and corrosive. It was also found that water was entrained in the $CS_2$ of line 17 and was thus carried into the purification system. An emulsion of oil and water deposited on the tubes of the lean oil cooler 13 thereby leading to a loss of heat exchange and a pressure drop. After about three weeks of operation, the heat exchange capacity of the cooler was reduced by about 25 percent. During the same period, the pressure drop across the cooler was observed to increase from below 3 p.s.i. to in excess of 10 p.s.i.

The flow sheet was then altered by removing line 21, pump 22 and heat exchanger 23 and adding line 31 and $H_2S$ compressor 32 as illustrated in FIGURE 2. A run was then made with the same composition of feed introduced at the base of the absorber. The operation was identical to the steam stripping operation hereinbefore described, except that $H_2S$ taken from line 4 was forwarded through line 31 via $H_2S$ compressor 32 to enter the bottom of the stripper at approximately 150 cubic feet per minute. It was found that $H_2S$ gas was effective in removing $CS_2$ from the heated oil. The problems encountered with steam stripping, i.e., corrosion, freezing, entrapped water and water-oil emulsion, were avoided with no noticeable detrimental effects on product purity.

Table 1 compares the percent by weight compositions of the process streams recited in the example and designated on the drawings.

TABLE I.—PERCENT BY WEIGHT COMPOSITIONS

| Process Stream | Absorber Feed | Absorber Recycle | Absorber Overhead | Stripper Feed | Absorbing Oil | Stripper Overhead | Product |
|---|---|---|---|---|---|---|---|
| Designation on Drawings | 1 | 3 | 4 | 5 | 10 | 14 | 17 |
| Steam Stripping: | | | | | | | |
| $CS_2$ | 51.5 | 56.1 | 1.2 | 18.1 | 0.1 | 90.0 | 96.5 |
| $H_2S$ | 45.6 | 42.0 | 93.2 | 0.7 | | 3.6 | 2.0 |
| Oil | | | | 81.0 | 99.8 | 0.6 | 0.8 |
| $H_2O$ | Trace | Saturated | Wet | 0.1 | 0.1 | 5.2 | Saturated |
| Other | 2.9 | 1.9 | 5.6 | 0.1 | | 0.6 | 0.7 |
| $H_2S$ Stripping: | | | | | | | |
| $CS_2$ | 50.1 | 42.1 | 1.2 | 19.0 | 0.1 | 87.6 | 97.1 |
| $H_2S$ | 47.2 | 57.3 | 93.9 | 0.7 | | 11.3 | 2.0 |
| Oil | | | | 80.2 | 99.9 | 0.1 | 0.2 |
| $H_2O$ | 0 | 0 | 0 | 0 | 0 | 0 | 0 |
| Other | 2.7 | 0.6 | 4.9 | 0.1 | | 1.0 | 0.7 |

Although the present invention has been described with reference to particular details of certain specific embodiments, it is not intended thereby to limit the invention except insofar as these details are recited in the appended claims.

I claim:

1. The method of recovering $CS_2$ from a gaseous $CS_2$-$H_2S$ mixture produced by reacting a sulfur source with hydrocarbon which comprises contacting said mixture in an absorbing zone with oil at an initial temperature below about 120° F. thereby absorbing $CS_2$ in the oil to the substantial exclusion of $H_2S$, maintaining the temperature of the oil-$CS_2$ mixture in said absorbing zone below about 180° F., heating said oil-$CS_2$ mixture to reduce its capacity to absorb $CS_2$ and contacting said heated oil with sufficient $H_2S$ to strip substantially all of the $CS_2$ from the oil thereby obtaining a gaseous $CS_2$-$H_2S$ mixture substantially richer with respect to $CS_2$ than the first-named $CS_2$-$H_2S$ mixture.

2. The method of claim 1 wherein the initial temperature of the absorbing oil is below about 100° F. and the temperature of the oil-$CS_2$ mixture is maintained below about 150° F. in the absorbing zone.

3. The method of claim 2 wherein the sulfur source is elemental sulfur and the hydrocarbon is natural gas.

4. The method of claim 3 wherein the second-named gaseous $CS_2$-$H_2S$ mixture is cooled to preferentially condense $CS_2$ to the substantial exclusion of $H_2S$.

5. The method of claim 4 wherein a condensed $CS_2$ liquid product containing less than about 2 percent $H_2S$ based on the total weight of the liquid product is recovered.

6. The method of recovering $CS_2$ from a gaseous $CS_2$-$H_2S$ mixture produced by reacting sulfur with hydrocarbons which comprises contacting the mixture in an absorbing zone with dry absorbing oil at a temperature below about 100° F. thereby absorbing $CS_2$ in the oil and recovering dry $H_2S$ gas from said absorbing zone, heating said $CS_2$-bearing oil to reduce its capacity to absorb $CS_2$, passing the heated oil-$CS_2$ mixture to a stripping zone and contacting said mixture in said stripping zone with said recovered dry $H_2S$ gas to strip substantially all of the $CS_2$ therefrom thereby obtaining a dry $CS_2$-$H_2S$ mixture substantially richer with respect to $CS_2$ than the first-named $CS_2$-$H_2S$ mixture.

7. The method of claim 6 wherein the $CS_2$-$H_2S$ mixture recovered from the stripping zone contains less than about 15 percent by weight $H_2S$.

8. The method of recovering $CS_2$ from a gaseous $CS_2$-$H_2S$ mixture containing in excess of 43 weight percent $H_2S$, basis the total weight $H_2S$ and $CS_2$ in the mixture, which comprises contacting said mixture with oil initially at 80 to 90° F. thereby absorbing $CS_2$ in the oil to the substantial exclusion of $H_2S$, heating the $CS_2$-bearing oil to reduce its capacity to absorb $CS_2$, contacting said heated oil with sufficient $H_2S$ to strip substantially all of the $CS_2$ from the oil thereby obtaining a gaseous $H_2S$-$CS_2$ mixture containing less than about 15 percent by weight $H_2S$ on the aforestated basis and cooling the second named gaseous mixture to preferentially condense $CS_2$ to the substantial exclusion of $H_2S$ thereby recovering $CS_2$ liquid containing less than about two percent $H_2S$.

9. The method of claim 8 wherein the temperature of the oil in the absorbing zone is maintained below about 140° F.

References Cited

UNITED STATES PATENTS

| | | | |
|---|---|---|---|
| 1,369,825 | 3/1921 | McElroy | 23—206 |
| 2,391,541 | 12/1945 | Belchetz | 23—206 |
| 3,240,564 | 3/1966 | Uffelmann | 23—206 |

REUBEN FRIEDMAN, *Primary Examiner.*

J. ADEE, *Assistant Examiner.*